United States Patent Office 3,489,709
Patented Jan. 13, 1970

3,489,709
SILICATE ESTER COMPOSITIONS
Gordon Halsey, Oswestry, England, assignor to Monsanto Chemicals Limited, London, England, a British company
No Drawing. Filed Dec. 5, 1966, Ser. No. 598,907
Claims priority, application Great Britain, Dec. 7, 1965, 51,828/65
Int. Cl. C08g 47/08
U.S. Cl. 260—33.4        10 Claims

ABSTRACT OF THE DISCLOSURE

This invention relates to binding agents, for example to certain new binding agents comprising a hydrolyzed silicate ester useful in the production of refractory articles. The binding agent of the present invention is one which comprises a hydrolyzed organic silicate ester and a glycol soluble in the hydrolyzed ester. The invention also comprises a process for the production of a binding agent according to the invention, in which an organic silicate ester is hydrolyzed in the presence, at least in the last part of the hydrolysis reaction, of a glycol soluble in the hydrolyzed ester.

---

The use of solutions of hydrolyzed silicate esters as binding agents for finely-divided refractory materials in the preparation of refractory articles in general, and particularly of refractory moulds for use in precision casting, is now a standard procedure.

Various ways of preparing such moulds have been proposed, and one which is economical in its use of refractory and silicate is the so-called shell moulding process. In this process a shell is formed round a pattern, which can for instance be made of wax, by coating the pattern with a slurry of the hydrolyzed silicate ester solution and the powdered refractory, allowing the slurry to gel, removing the pattern in some appropriate way, and heating the gelled slurry to a temperature at which the gel is converted to silica, thereby cementing the particles of the refractory material together to give a strong shell mould. Usually, in order to form a shell mould of sufficient strength for most industrial uses, the above referred to steps of coating the pattern and allowing the slurry (coating) to gel is repeated a plurality of times, e.g., three to ten times.

We have now found a new and improved series of binding agents that comprise a hydrolyzed silicate ester; these can be employed in the production of ceramic shell moulds and for other purposes.

Also included within the invention is a process for the production of a refractory article, in which there is employed a binding agent according to the invention.

The binding agent of the invention can also be employed for example as a mould wash or as a pattern wash.

The silicate ester that is hydrolyzed can be an orthosilicate but in practice is usually a condensed silicate, that is to say a mixture of polysilicates. Good results are obtained using an ethyl silicate (e.g., tetra-ethyl ortho silicate) for example a mixture of ethyl silicates prepared by the reaction of silicon tetrachloride with ethyl alcohol containing a small proportion of water. The commercial ethyl silicate sold under the name "Silester OS" ("Silester" is a registered trademark) is particularly useful. Other suitable silicates include for instance other alkyl ortho silicates, particularly the lower alkyl (1–5 carbon atoms) ortho silicates, such as isopropyl silicate, tetra-butyl ortho-silicate, tetra-pentyl orthosilicate and the like.

The glycol, that is to say a dihydric alcohol, is usually one that is soluble in water. Normally it is a liquid, and the term "soluble" accordingly includes "miscible." A liquid glycol need not be miscible with the hydrolyzed ester in all proportions, so long as it is miscible in the proportion that it is present in the binding agent. The glycol is preferably an aliphatic glycol, particularly for instance one containing up to four carbon atoms. Lower alpha-alkylene glycols such as ethylene glycol, alpha-propylene glycol and alpha-butylene glycols are very suitable. Higher glycols and polymethylene glycols that are water-soluble in the required proportions, for example trimethylene glycol and pentamethylene glycol, or aromatic glycols, for example xylene glycol, can also be used if desired. Particularly preferred is ethylene glycol with which excellent results have been obtained. A mixture of glycols can be employed.

The quantity of glycol can for instance be from 5% up to about 30% or 40% by volume of the binding agent, and particularly in the range 5% to 25% by volume, for example 10% or 20% by volume. About 10% by volume is often a preferred quantity.

The glycol can be mixed with the silicate ester after the latter is hydrolyzed, but it can also (and this is according to a process of the invention) be present during at least the last part of the hydrolysis reaction. For example it can be present during at least the last 10% of the reaction. Preferably it is present from the start of the hydrolysis. The silicate ester is usually hydrolyzed with water, for instance with up to about 15% by weight of water, although the amount of water used is preferably somewhat lower than that which would normally be employed to hydrolyze the ester when no glycol is intended to be present in the binding agent. For instance, although the silicate ester can be hydrolyzed in the presence of up to 15% by weight of water the amount is preferably between 1% and 10%, for example about 5% by weight. The hydrolysis reaction is normally carried out to substantial completion although this is not essential.

Preferably an acid catalyst is used in the hydrolysis of the silicate ester. This is preferably hydrochloric acid, but other acids can be employed, for instance oxalic acid. The amount is generally very small, for example about 0.1 gram of a 32% by weight solution of hydrochloric acid in 100 grams of the reaction mixture is usually sufficient, although more or less than this, for example 0.05 to 0.5 gram per 100 grams of the mixture can be used in certain instances.

The presence of a water-miscible organic solvent, other than such glycol, during hydrolysis is desirable since this assists in the formation of a homogenous binding agent. It can be for example ethyl alcohol, isopropyl alcohol, or other aliphatic monohydric alcohol or (possibly) a water-miscible ketone such as acetone, methyl ethyl ketone or the like. Since the quantities of water and glycol are fixed within the limits mentioned above, the amount of any such additional solvent used in the solution is determined partly by the concentration of silicate (expressed in terms of silica, $SiO_2$) which is required. As a guide, very good results are obtained when the silica content ($SiO_2$) of the binding agent is in the range of 15% to 35% by weight, for example about 25%. It is necessary to allow when formulating the binding agent for the fact that the commercial grade of glycols and water-miscible organic solvents usually contain a certain amount, possibly up to 10% by weight, of water, for example 0.2 to 10% by weight of water.

The binding agent is preferably for example prepared by mixing the appropriate proportions of the glycol, water, and any organic solvent or catalyst used, and then adding the silicate ester gradually with stirring. Variations on this procedure can however be made without serious effect on the results.

In a preferred embodiment of this invention the homogenous binding agent comprises a liquid composition composed of hydrolyzed tetra-ethyl orthosilicate in a concentration sufficient to provide about 15% to about 35% by weight of silica ($SiO_2$), based on such composition, from about 1 to about 10% by weight of water, and from about 5 to 40%, by volume, based on the volume of such composition, of a liquid, dihydric alcohol miscible with such hydrolyzed silicate in the proportions stated, preferably ethylene glycol. Such compositions preferably also contain a water-miscible aliphatic monohydric alcohol, desirably in amounts of about 20 to about 45% by volume, based on the composition.

In a process for the production of a refractory article, particularly a shell mould, the binding agent is usually used in a slurry together with a powdered refractory filler. The filler can be any of these normally used in the production of moulds for metal casting, including for example various oxides, such as for example silica (in the form of powdered flint, for instance) alumina, magnesia or zirconia, silicon carbide, alumino silicates such as molochite, sillimanite or mullite, silicates such as zircon or forsterite, and various calcined fireclays such as for instance calcined Ayrshire or Stourbridge clays. The particle size of the refractory material in the compositions of the present invention is usually less than 200 BSS mesh, that is to say none of the powder is retained on a 200 mesh British Standard sieve, and preferably the refractory should contain a significant proportion, perhaps 50 to 75% of material having a particle size less than 300 BSS mesh. The lower limit of particle size is usually about 10 microns.

The slurry can be prepared simply by mixing the powdered refractory filler a little at a time with the hydrolyzed silicate ester solution until the slurry formed has a viscosity in the correct range; such a viscosity corresponds roughly with the consistency of fairly thin cream. A slurry of suitable viscosity usually contains between about 30 and about 90 parts by weight of the hydrolyzed silicate ester solution per 100 parts by weight of the refractory filler, depending mainly on the type and state of subdivision of the refractory.

The slurry can be applied to the pattern of a shell mould using established procedures, for example by spraying or more usually by dipping.

The coating of slurry is gelled either by exposure to the atmosphere, or by exposure to a hardening agent, normally at room temperature. As previously mentioned, each coating is normally covered with a layer of "stucco" refractory particles (usually of a larger particle size than the particles employed in the slurry) whilst it is still moist. The particles can be applied to the moist layer of slurry covering the pattern by for example allowing the particles to fall on the slurry layer, or by immersing the coated pattern in a mass of the particles maintained in a state of agitation by means of a current of air or some other suitable gas. Any of the refractory materials mentioned above can be used for the stucco, but preferably particles of such materials are used which pass through a 10 mesh BSS sieve but are retained on a 100 mesh BSS sieve.

Very often the binding agent is caused to harden by the action of a gelation accelerator, so as to form with the stucco a refractory coating. The accelerator can for example be ammonia, or an organic amine such as for instance pyridine, piperidine or dicyclohexylamine. Ammonia is however the preferred accelerator, and gelation can conveniently be effected by transferring the slurry-coated pattern to a chamber provided with an open reservoir containing a strong aqueous solution of ammonia. An alternative technique is to arrange for a stream of ammonia vapour to pass through the chamber in which the slurry-coated pattern is situated. The duration of the exposure required to effect gelation will vary somewhat depending on such factors as the thickness of the coating of slurry and the precise formulations of the slurry. Generally for instance an exposure of at least 15 seconds but not more than 60 seconds is sufficient, although in some circumstances longer exposure may be preferable. The optimum duration of exposure for any given set of conditions is of course readily determined.

Alternatively the layer of slurry and stucco can merely be caused to harden by allowing it to stand for a period of time, during which period some or all of the water or other solvents originally present evaporate off and cause gelation. Normally such a procedure takes longer, perhaps one hour or several hours, than if a gelation accelerator is employed.

After the final coating of slurry has been applied and either gelled or allowed to harden, the product is dried and heated to a high temperature at which the gel is converted to silica. For example, temperatures of about 400° C. to 1000° C., commonly known in the art, may be used. A pattern made of wax or other fusible material such as a thermoplastic synthetic resin disappears during the heating stage of the process, and the final product is then a hollow shell ready for use. When a non-expendable pattern is employed, then it is necessary to split the shell mould, generally into two parts, and remove these from the pattern. Alternatively, in the case of wax patterns the wax pattern removal technique described in U.S. Patent No. 3,148,422 may be used, followed by an additional heating at elevated temperatures as aforementioned.

While the invention has been described with particular reference to the production of refractory shell moulds for use in metal casting, it is applicable also to the production of other refractory articles such as for instance massive investment moulds, grinding wheels and refractory bricks. Other uses for the compositions have been referred to above.

The invention is illustrated by the following example.

EXAMPLE

This example describes a binding agent according to the invention and its use in the production of a shell mould suitable for casting a rocker arm for a motor car engine.

The binding agent was prepared as follows:

2280 cc. of Silester OS (a commercial ethyl silicate containing the equivalent of 40 to 42% by weight of silica) were poured slowly with stirring into a mixture of 440 cc. of ethylene glycol, 120 cc. of water, 4 cc. of concentrated hydrochloric acid (specific gravity 1.16), and 1690 cc. isopropyl alcohol. The quantity of water present was about 5.3% by weight of the ethyl silicate. Stirring was continued for a further 30 minutes and the solution was then allowed to stand for 24 hours. Production of the binding agent was then complete. It had good stability.

21 kilograms of Zircosil 200 (zircon of particle size less than 200 BSS mesh) were added gradually with continuous stirring to the binding agent, giving a stable slurry having a viscosity of 80 seconds measured using a Ford 4B cup. It was found that there was little tendency for the refractory particles to settle out of the slurry, and any that did settle during the course of a day or so were easily redispersible by stirring.

A wax pattern of a rocker arm provided with a length of stout wire to act as a handle was then dipped into the slurry, rotated slowly to insure a uniform coating and the absence of entrapped air bubbles, and then removed and allowed to drain for 40 seconds. A stucco of molochite of particle size such that none was retained on a 30 mesh BSS sieve but all was retained on an 80 BSS sieve was then applied to the wet surface as uniformly as possible. The coated pattern was then transferred to a chamber provided with an open reservoir of concentrated aqueous ammonia (specific gravity 0.880) and rotated slowly in the ammonia-enriched atmosphere for 60 seconds. At the end of this period the coating had hardened and the stucco particles were found to be well-adhered.

Further coatings were applied of a slurry prepared as the above but with 10 kilograms of molochite 6 of particle size less than 200 BSS mesh instead of Zircosil 200. These coatings were stuccoed with molochite of particle size such that none was retained on a 10 BSS mesh sieve but all was retained on a 30 BSS mesh sieve. The coatings were hardened by the method described above. The process was repeated applying alternately slurry and stucco until a total of 6 layers had been built up. After exposure of the final layer to ammonia the coated pattern was dried in a stream of warm air until the alcohol and water had been removed.

The wire handle was withdrawn and the whole assembly was then placed in a furnace at a temperature of 1050° C. The wax melted and burnt out and a firm shell mould of refractory material was left in which a rocker arm was then cast. The casting had an excellent surface finish.

In a comparative experiment in which no glycol was present in the slurry, the refractory particles had a greater tendency to settle out and were not so readily redispersible, and furthermore the finished casting did not have such an excellent surface finish.

What is claimed is:

1. A binding agent comprising a homogenous liquid composition of a liquid hydrolyzed organic silicate ester, and a dihydric, liquid glycol soluble in said hydrolyzed ester and selected from the group consisting of aliphatic glycols, polymethylene glycols and xylylene glycol, said glycol being present in an amount of from about 5% to about 40% by volume based on the total volume of the binding agent.

2. An agent according to claim 1, wherein said hydrolyzed ester is hydrolyzed ethyl silicate and said glycol is an aliphatic glycol containing up to 4 carbon atoms.

3. An agent according to claim 2, wherein said hydrolyzed ester is hydrolyzed tetra-ethyl orthosilicate and said glycol is ethylene glycol.

4. A composition for use in binding refractory particles comprising a homogenous liquid composed of hydrolyzed tetra-ethyl orthosilicate in a concentration sufficient to provide from about 15% to about 35% by weight of silica, based on said composition, and from about 5 to 40% by volume, based on the volume of said composition, of a liquid, dihydric, glycol miscible with said hydrolyzed ester in the range of proportions set forth and selected from the group consisting of aliphatic glycols, polymethylene glycols and xylylene glycol.

5. A composition according to claim 4, wherein said composition also contains about 20% to about 45% by volume, based on such composition, of a water-miscible aliphatic monohydric alcohol.

6. A process for the production of a binding agent which comprises hydrolyzing, in a hydrolysis reaction, a hydrolyzable organic silicate ester in the presence of water and having present in at least the last part of the hydrolysis reaction a dihydric, liquid glycol soluble in the resultant hydrolyzed ester and selected from the group consisting of aliphatic glycols, polymethylene glycols and xylylene glycol, said glycol being present in an amount of from about 5% to about 40% by volume based on the total volume of the binding agent.

7. A process according to claim 6, wherein the amount of water used in hydrolyzing said silicate is from about 1 to about 10% by weight of said ester.

8. A process according to claim 6, wherein a water miscible organic solvent, other than a glycol, is present during at least part of said hydrolysis reaction and the quantities of said ester and solvent employed are sufficient to provide a composition having a silica content of about 15 to 35% by weight.

9. A process according to claim 8, wherein said glycol is an aliphatic glycol containing up to 4 carbon atoms and said organic solvent is an aliphatic monohydric alcohol.

10. A process according to claim 9, wherein said glycol is ethylene glycol and said alcohol is ethyl alcohol.

References Cited

UNITED STATES PATENTS 2,027,931　1/1936　Ray.

FOREIGN PATENTS 166,249　1/1953　Australia.

MORRIS LIEBMAN, Primary Examiner

L. T. JACOBS, Assistant Examiner